United States Patent [19]
Barzegar et al.

[11] Patent Number: 5,257,397
[45] Date of Patent: Oct. 26, 1993

[54] MOBILE DATA TELEPHONE

[75] Inventors: Farhad Barzegar, Hillsborough; Can A. Eryaman, Frankford; Jesse E. Russell, Piscataway; Robert E. Schroeder, Flanders, all of N.J.

[73] Assignee: AT&T Bell Laboratories, Murray Hill, N.J.

[21] Appl. No.: 566,733

[22] Filed: Aug. 13, 1990

[51] Int. Cl.⁵ .............................................. H04Q 7/00
[52] U.S. Cl. .................. 455/33.1; 455/52.1; 455/63; 379/59
[58] Field of Search ............... 455/33.1, 52.1, 52.2, 455/52.3, 56.1, 50.1, 63, 67.3, 69; 379/59, 60

[56] References Cited
U.S. PATENT DOCUMENTS 4,697,281 9/1987 O'Sullivan ............................. 455/69
4,837,800 6/1989 Freeburg et al. ...................... 379/59
5,142,534 8/1992 Simpson et al. ..................... 370/95.1

Primary Examiner—James L. Dwyer
Assistant Examiner—Edward Urban
Attorney, Agent, or Firm—Alfred G. Steinmetz

[57] ABSTRACT

A mobile data telephone capable of transmitting and/or receiving voice and/or data signals over cellular communication channels or other air interfaces comprises a radio transceiver and a data modem in the same physical package. The transceiver and the modem have their respective controllers coupled so that they are effectively linked to achieve control of data transfer therebetween. In response to communication channel conditions in the air interface, the data flow between the modem and an audio processor of the transceiver can be selectively altered yielding high performance and high quality data transfer rates in the presence of severe channel impairments.

8 Claims, 3 Drawing Sheets

5,257,397

MOBILE DATA TELEPHONE

TECHNICAL FIELD

The present invention relates to mobile radio telephone systems and, more particularly, to mobile data telephones capable of transmitting and receiving voice and/or data signals over air communications channels during movement of the mobile.

BACKGROUND OF THE INVENTION

In high capacity mobile radiotelephone communication systems, a plurality of base stations, also referred to as cell sites, are arranged so that each cell site covers a respective geographical area called a cell. These cells are grouped together to provide a wide area system coverage. Typically, each such cell site contains a pair of transmitter-receivers with a control that redirects traffic between cells to follow subscriber movement within a certain geographical coverage area. These systems are formed into a regional or nationwide network of telephone switching offices that link the mobile subscriber to the land based telephone network.

Because of a growing mobile radiotelephone customer base, mobile telephone service providers are faced with an increased demand for a variety of new and improved mobile services, such as for example, mobile data services. It is well known that mobile channel impairments contain regularly occurring signal level drops, and long interval degradations resulting from movements of the mobile transceiver within a cell along with interruptions from system signaling events termed blank and burst, where normal audio transmission is suspended for a short period to support system data management. Moreover, the topography of the terrain during such movements of the mobile station, as well as travel in high noise areas, can result in significant variation in transmission quality and/or reception of voice and data. Also, at the boundary of a cell in the hand-off range, i.e., when a moving mobile station travels out of one cell into a contiguous neighboring cell, a signal-to-noise ratio that may be marginally acceptable for voice service will often lead to errors during data transmission and/or reception. Typically, data products are not too tolerant of high error rates normally encountered with a voice grade of mobile radio telephone service because of the lack of interpretative ability found in normal conventional voice communications. Therefore, there exists a need for a mobile date telephone of a type capable of supporting high quality robust data transfer over the mobile channel air interface.

SUMMARY OF THE INVENTION

The foregoing need is met in an illustrative embodiment of the invention wherein a mobile data telephone for transmitting and receiving voice and data signals over cellular communication channels comprises a mobile transceiver including a first processor for processing voice signals, a second processor for processing data signals, and first controller connected to the first and second processors; a data modem connected to the mobile transceiver and including a third processor, a second controller connected to the third processor, and a data port; means for coupling the first controller and the second controller so that the mobile transceiver and the data modem are linked to achieve control of data transfer therebetween; and means for selectively altering data flow between the data port and the first processor in response to mobile communication channel conditions.

In accordance with one aspect of the invention, data transfer between the second controller and the first processor is interrupted by the system signaling means when the audio communication path is not available such as, for example, during handoff, blank and burst intervals, or power level adjustments as commanded from the cell site.

In a particular illustrative embodiment of the invention, the data rate of the data modem is switched into and out of a robust mode to maintain data transmission integrity in response to existing channel conditions, e.g., weak signaling or signal conditions.

BRIEF DESCRIPTION OF THE DRAWINGS

Further features and advantages of the present invention will become apparent from the following detailed description taken together with the drawings in which.

DETAILED DESCRIPTION

Figure 1:
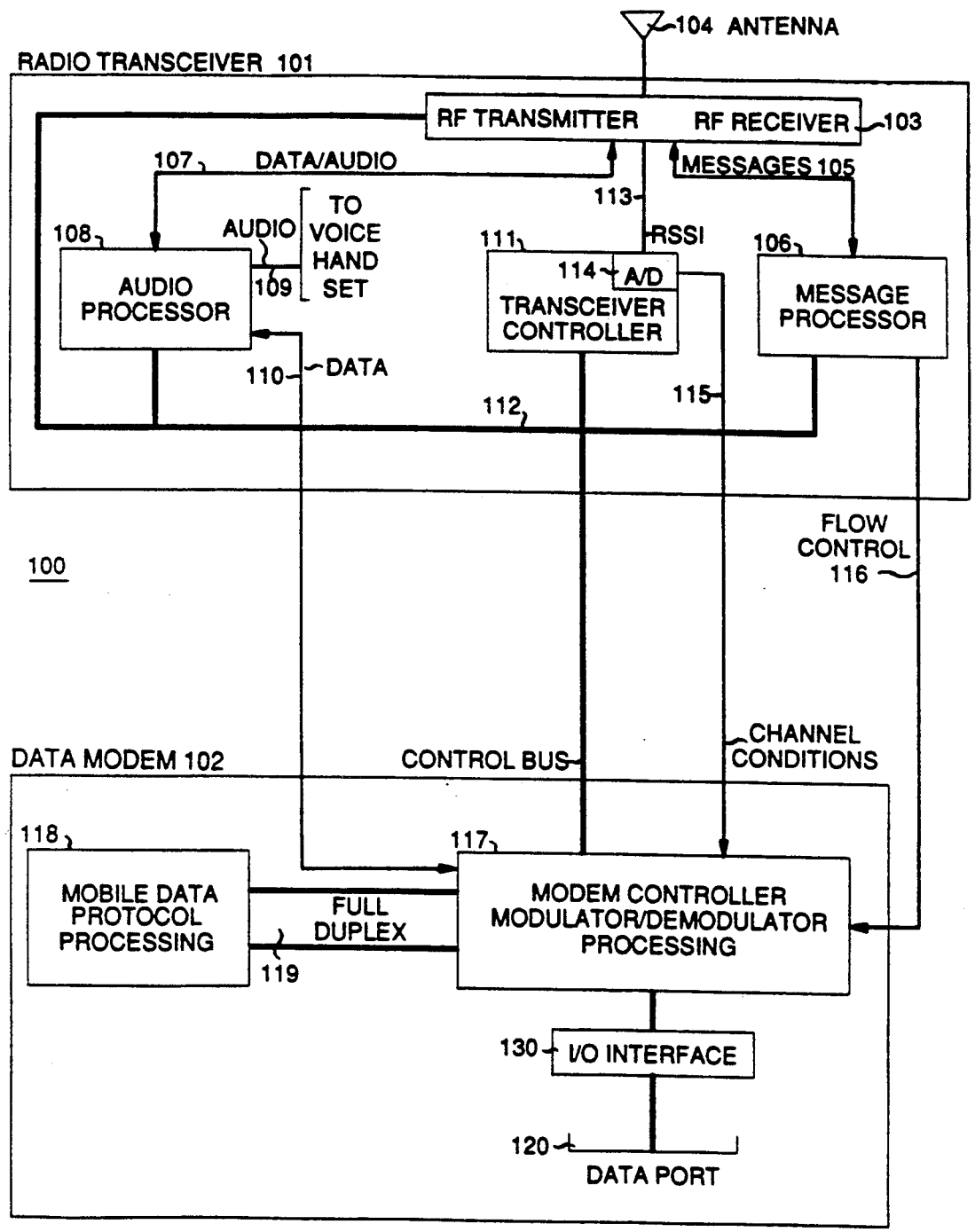
FIG. 1 is a functional block diagram representation of a mobile data telephone in accordance with an illustrative embodiment of the invention.

Referring to FIG. 1, there is shown, in functional block diagram form, a mobile data telephone 100 in accordance with an illustrative embodiment of the invention. The mobile data telephone 100 comprises a radio transceiver portion 101 connected to a data modem portion 102. The radio transceiver portion 101 includes a radio frequency receiver/transmitter 103 coupled to an antenna 104 which is adapted to receive and transmit signals from and to a cell site (not shown) or another mobile data telephone. Coupled to the receiver/transmitter 103, via a bidirectional message connecting lead 105, is a processor 106 capable of receiving and processing system message-type signals. Also coupled to the receiver/transmitter 103, via another bidirectional connecting data/audio lead 107, is a processor 108 adapted to process data signals as well as audio signals originating or received at the mobile data telephone 100. Audio and data signals present on lead 107 are those signals intended for and derived from the antenna 104. Audio signals present on a group of leads 109 connected to the processor 108 are directed to or derived from a voice hand set (not shown). Data signals present on data lead 110 connected to the processor 108 are directed to or derived from the data modem 102.

Within the radio transceiver 101, a controller 111 is coupled to the message processor 106 and the audio processor 108, via a control bus 112, which is also coupled to the receiver/transmitter 103. In accordance with one illustrative embodiment, a signal RSSI indicative of the strength of received radio signals is derived from the receiver/transmitter 103 and coupled via lead 113 to an analog-to-digital converter 114 within the controller 111. The output signals of the converter 114, present on lead 115, are digital representations of the mobile communication channel conditions. Also, in accordance with another illustrative embodiment, the message processor 106 generates flow control signals on an output lead 116 in response to the processing of messages received on input lead 105.

As shown in FIG. 1, the data modem 102 comprises a modem controller 117 coupled to the radio transceiver 101, via the control bus 112 and the bidirectional data link 110. Also connected to the modem controller 117 is the channel conditions transceiver lead 115 and the flow control lead 116. A data protocol processor 118 is connected to the modem controller 117 via a full duplex link 119. This processor may be implemented either in a hardware form or in a software mode or in a combination of these two forms. Also connected to the modem controller 117 is a data port 120 adapted and selected for enabling the interface of a data terminal equipment (not shown) with the mobile data telephone. Such a data port 120 may include for example, an RS-232C interface, and will also support a wide range of interfaces such as a CCITT Type V Series or ISDN with appropriate input/output circuitry interfaces along with adjustments to elements contained in radio transceiver 101 and data modem 102.

The operation of the mobile data telephone 100 shall now be described under various channel conditions. Under good communication channel conditions, i.e., in a clear mode, data signals received at the antenna 104 and coupled to the receiver/transmitter 103 are present on lead 107 and coupled to the processor 108. The data signals are next coupled to the data modem 102 through lead 110 and, via the modem, to the data port 120, via I/O interface 130, for use by the data user. Similarly, in a clear mode, data originating at the data port 120 and intended for transmission by the antenna 104 is first directed to the modem controller 117, via I/O interface 130, and then via the data lead 110, the processor 108, the data/audio lead 107 and the receiver/transmitter 103. The structure of a data frame in the clear mode, as illustrated in FIG. 3, includes a synchronization segment (e.g. Barker sequence), a control segment, a data segement and a coding segment.

Under adverse channel conditions, another frame structure is used which is hereinafter referred to as a robust mode. In accordance with an illustrative embodiment of the invention, all user data, present at the data port 120 and intended for transmission by the antenna 104, is coupled to the modem controller 117 for first constructing frames from such user data. In adverse channel conditions, as identified by the presence of channel condition signals on lead 115, the frames are first filled with user data and internal control data. Instead of coupling such frames to the modulator and to the data lead 110 as described in the clear mode case, the frames are sent, via the full duplex link 119, to the mobile data protocol processor 118 for encoding using an error correcting technique, preferably a Forward Error Correction (FEC) encoding technique. The resultant encoded frames are next sent, via the full duplex link 119, to the modem modulator 117. Next, the modulated data signals are passed on to the processor 108, via data lead 110, and to the data/audio lead 107 for transmission by the antenna 104. During data transmission by the transmitter 103 and the antenna 104, acknowledgment messages are received by the antenna and directed, via lead 107, to the audio processor 108. In the event that the transmission of data is impaired, flow control signals generated by the message processor 106 and present on the lead 116, are coupled to the modem controller 117 for interrupting the flow of data from the modem 102 to the transceiver 101. The foregoing data flow interruptions will occur, for example, when due to system signaling, an audio communication path between the mobile data telephone and the cell site is not available during handoff, or a blank/burst interval as during power level adjustments for example.

Figure 2:
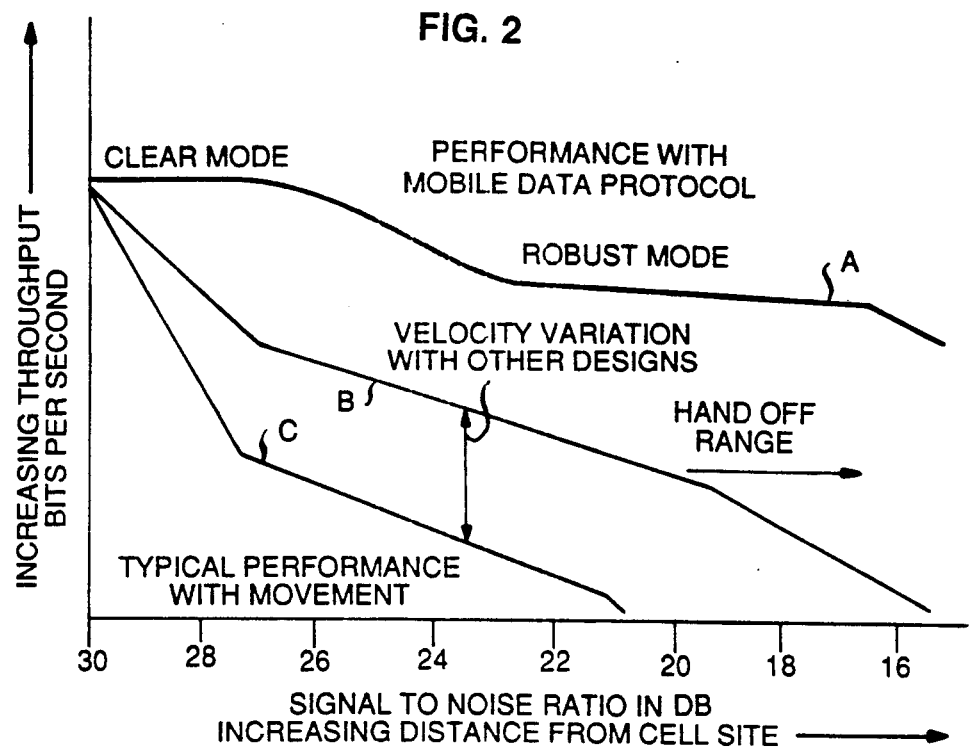
FIG. 2 is a diagram showing the data throughput of the mobile data telephone of FIG. 1 as compared to that of other known arrangements as a function of degrading channel conditions.

The effect of the movement of a subscriber using the mobile data telephone 100 on the data throughput is shown by the curve identified as "A" in FIG. 2 representing the performance of the mobile data telephone 100 in the clear and robust modes. Curves "B" and "C" in FIG. 2 illustrate the substantial degradations of data throughput which are typically present in prior art arrangements.

Figure 3:
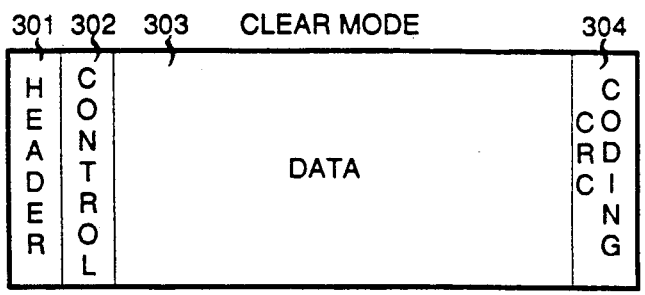
FIGS. 3 and 5 illustrate frame structures for clear mode and robust mode, respectively.

In accordance with an illustrative embodiment, the data transmission frame construction in the clear mode, as shown in FIG. 3, comprises a synchronization header segment 301, a control segment 302, a fixed data segment 303 and a cyclic redundancy check (CRC) coding segment 304. These segments can be adjusted in length to suit particular application needs. In a preferred arrangement, the header segment 301 is a 16-bit word, the control segment 302 is comprised of 3-byte section, the data segment 303 includes a 63-byte section and the coding segment 304 comprises a 16-bit section. As will be further explained below, the data frame synchronization header 301 used in this mode differs from the header 306 used for the robust mode shown in FIG. 5. Various alternatives exist in the selection of the synchronization header 301 and of the tolerances allowed for frame locking. One such alternative makes use of a Barker code which locks the frame even if up to 2 of the header bits are incorrect. The control segment 302 comprises bit fields for determining frame sequence number, frame length and frame type specifier. In accordance with a specific embodiment, the control segment 302 advantageously uses an 8-bit frame sequence number, an 8-bit length, and an 8-bit frame type specifier. The frame sequence number is used to support Automatic Repeat Request (ARQ) operation and to detect the validity of contiguous data frames. The field length is used to determine how many data bits within the data segment 303 are present. Since the length of the data segment 303 of the frame is fixed, a special operation is used when data fed to the transmitter is sparse, such as forming a data segment by using actual data plus filler or null bits. In the foregoing example, the length of valid data will be a number less than or equal to the selected fixed length of the data segment. The purpose of the frame type specifier is to provide means for in-service testing, loopback, packeting, etc. The user data stream is typically provided to the modem controller 117 from the data terminal equipment coupled to the data port 120 via I/O interface 130. The special protocol, system frame timing and other signaling means are only used internally to the mobile data transceiver/modem 100 and are removed from the user data stream.

Figure 5:
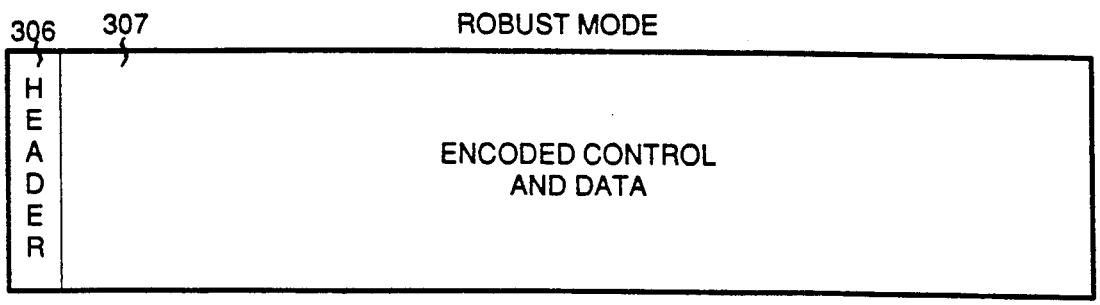

In the robust mode of operation, which utilizes a two-level interleaved format, the user data which flows either from the data port 120 via I/O interface 130 or from antenna 104 is encoded preferably by a Reed-Solomon encoder within the protocol processor 118. FIG. 5 depicts the frame in the robust mode. In this particular embodiment, the input data and control information is passed on to the protocol processor 118 and preferably first put in a form of a predetermined number of symbols each composed of a control header portion as in the clear mode and user data portion. In the above-mentioned preferred example, the 3-byte control segment and the 63-byte data segment are encoded into 44 6-bit symbols (i.e., 33 bytes of 8-bit each) with 4 symbols of control header and 40 symbols of data. Next, operation is repeated except that each symbol generated by the protocol processor 118 now comprises user data only (i.e., in the foregoing example, 44 symbols of data are now generated). The two sets of symbols generated from the foregoing first and second steps are next interleaved resulting in an encoded and data segment 307 in FIG. 5. By use of this method, the combination of the two steps incorporates a maximum number of bytes of user data, just as in the clear mode.

Due to the integration of the radio transceiver 101 in the same physical package as that of the data modem 102, many internal signals of the radio are available to the modem. The value of the RSSI signal, for example, is used to recognize signal level changes such as dips or fades. This information is directly coupled to the demodulator portion of the modem controller 117 which is used to calculate the energy content of the received symbol, which in turn can be used to enhance the Reed-Solomon decoding algorithm. This feature is commonly termed decoding with erasure or soft decision decoding. Without it, the decoder within the protocol processor 118 can only correct a predetermined number of erroneous symbols per frame. However, by estimating which of the symbols are believed in error (e.g., during real-time channel conditions evaluation of the RSSI signal), some of the symbols may be marked as erasures thereby increasing the total number of correctable symbols accordingly. This results from the fact that it takes two symbols in order to correct an error, while it takes only one parity symbol to correct an erasure. Thus, the correction capabilities of the decoder are enhanced. Also, during blank and burst operation (during system communication between the mobile radio and the cell site, or the MTSO and the cell site) the system overhead control data briefly occupies the channel thereby preventing user data or voice transmission. The control messages enable to sense the onset of these events and to control the data flow accordingly. In particular, decoding of the control messages, present on lead 105, by the message processor 106 and interpretation by the modem controller 117 of the flow control signals, present on lead 116, are used to halt the modem transmission of the data thus saving internal buffer space. This action substantially enhances the speed of the data modem recovery after an interruption resulting in increased overall data throughput.

Figure 4:
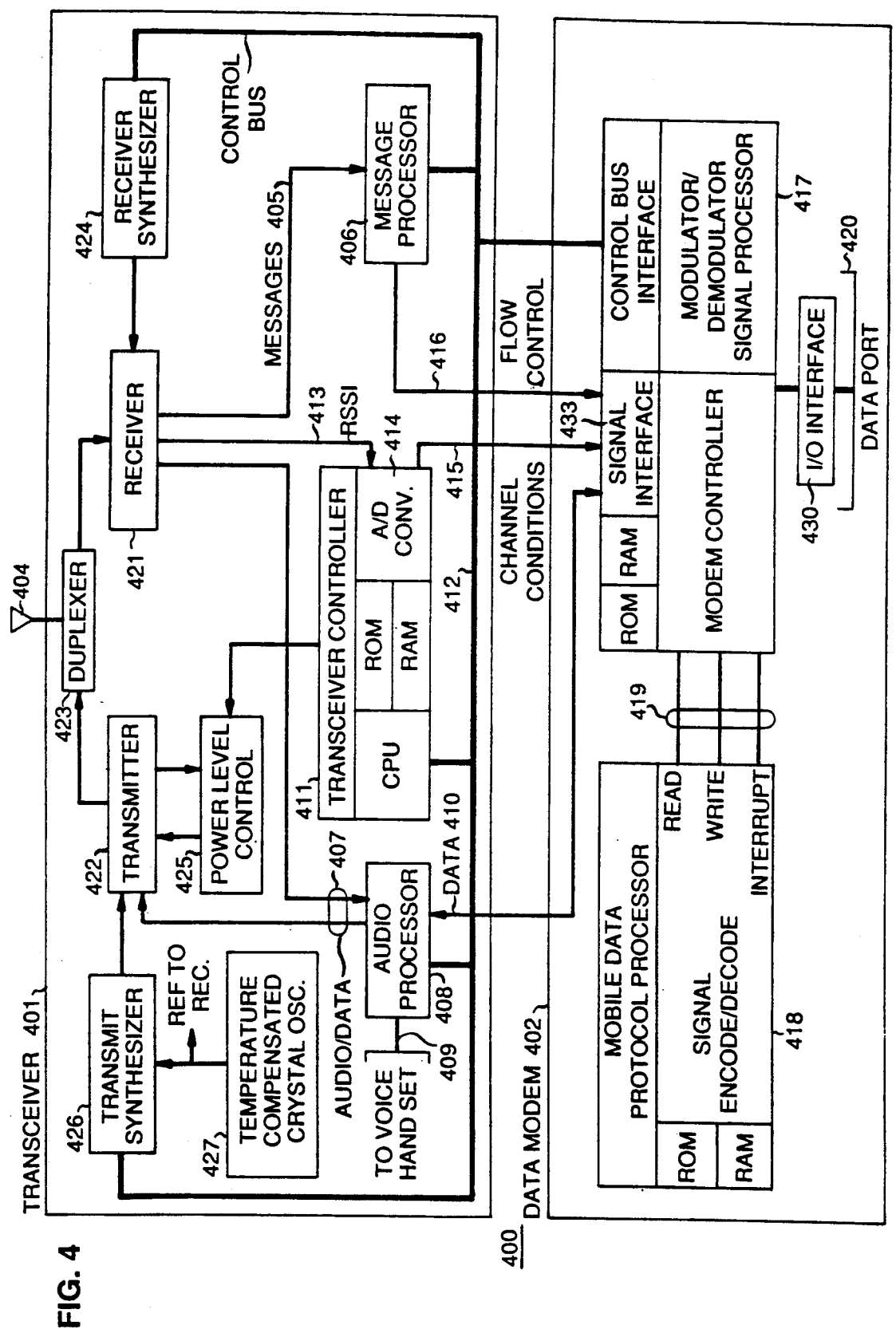
FIG. 4 is a block diagram of a specific cellular data telephone circuit in accordance with an embodiment of the invention.

Referring now to FIG. 4, there is shown a detailed block diagram of one specific arrangement of a cellular data telephone 400 in accordance with an embodiment of the invention. This data telephone includes a transceiver 401 and a data modem 402. A duplexer 423, included in the transceiver 401, is shown interconnecting a transmitter 422 and a receiver 421 to a transmitting and receiving antenna 404. The respective frequency of the transmitter 422 and the receiver 421 is controlled via a transmission synthesizer 426 and a receiver synthesizer 424 whose associated respective reference frequency for radio frequency/intermediate frequency conversions is supplied by a local oscillator 427, which preferably comprises a temperature compensated crystal oscillator.

A power level control 425 adjusts the power level output of the transmitter 422 to maintain system performance and to limit adjacent channel interference with other cell channels and to eliminate the near-far problem. Power level control is normally determined by system commands based on radio frequency measurements from the cell site station. In the illustrative embodiment this transceiver control is provided through the transceiver controller 411 which is in turn responsive to the overhead control messages received by the message processor 406.

Analog data and voice signals for and from the transmitter 422 and the receiver 421 are processed by the voice and data audio processor 408. Audio processor 408 is connected to the control bus 412 which interconnects the audio processor 408 to the transceiver controller 411, under control of the transceiver controller 411. Transceiver controller 411 includes the A/D converter 414 which is operative for monitoring the signal quality through the receiver 421. The A/D converter output signal, present on lead 415, determines in part if the transceiver is to operate in the clear or the robust mode as described herein above in connection with FIG. 1.

Analog data received by the audio processor 408 is transmitted, via leads 410, to the data modem signal interface 433 included in the modem controller 417. A protocol processor 418 is connected to the modem controller 417, via the data and control leads 419, and provides the algorithmic control for reading and encoding/decoding and error correction of the codes received from and intended for the audio processor 408. Alternatively, the entire task of the protocol processor 418 can also be performed within the modem controller 417 if such controller 417 is selected among commercially available powerful processors. Data is received or transmitted to the I/O interface 430, which in turn is connected to the data port 420. Since the remaining circuit elements of FIG. 4 are functionally equivalent to corresponding elements shown in FIG. 1 such remaining circuit elements will not be described again.

While a particular embodiment of the transceiver has been disclosed, it is to be understood that many other embodiments will suggest themselves to those skilled in the art without departing from the spirit and scope of the invention.

We claim:

1. A mobile data telephone for transmitting and receiving voice and data signals over communication channels using an air interface comprising:

a radio transceiver including a first processor for processing voice and data signals, a second processor for processing system message signals, and first control means connected to said first and second processors and the first control means including means for detection of communication channel conditions;

a data modem connected to the transceiver and including a third processor, second control means connected to the third processor and a data port connected to supply data, via the second control means to the first processor during good communication channel conditions;

means for coupling the first control means and the second control means so that the transceiver and the data modem are linked to achieve control of data therebetween;

means for coupling the means for detection to the second control means;

the second control means, responsive to the means for detection, determining an adverse communication channel condition by interrupting direct data flow from the second control means to the first processor and controlling data flow to flow between the data port and the first processor via the third processor and the third processor including signal coding means for adding data protective coding to the data.

2. A mobile data telephone according to claim 1 wherein the signal coding means includes an error correcting protocol processor for adding protective coding to the data.

3. A mobile data telephone according to claim 2, wherein the protocol processor utilizes a forward error correction encoding technique.

4. A mobile data telephone according to claim 3, wherein the protocol processor includes an encoder of the Reed-Solomon type.

5. A wireless data transmission system for operation with mobile radiotelephones in a transmission environment subject of frequently occurring fading conditions including signal level attenuations and mobile movement-related signal degradations, comprising:

a transceiver apparatus including a voice and data processing unit, a transceiver controller for controlling throughput of the voice and data processing unit, and including channel condition monitoring means for detecting substandard channel conditions;

a data modem apparatus including a data input/output port, a data processing circuit including a modulator/demodulator, and a data modem controller for constructing frames of data signals for transmission;

the data modem controller responsive to the channel signal condition monitoring means for selecting a data path for controllably coupling the data input/output port to the voice and data processing unit via, a first means for coupling the data modem throughput to the voice and data processor via a direct connection between the data modem controller and the voice and data processor during acceptable signal conditions, a second means for coupling the data modem throughput to the voice and data processor via a connection including a sending of data to the data processing circuit for encoding the signal to enhance its accuracy during adverse signal conditions and coupling the encoded signal to the data modem controller and from thence to the voice and data processor; and means for controlling the first and second means for coupling in response to system conditions.

6. A wireless data transmission system according to claim 5, wherein the means for controlling comprises means for adding coding protection to the signal when transmission is via the second means for coupling in response to predetermined channel impairments.

7. A wireless data transmission system according to claim 6 wherein the means for adding coding protection utilizes a forward error correction encoding scheme.

8. A wireles data transmission system according to claim 5, wherein the means for controlling comprises means for temporarily disabling the data modem in response to the unavailability of an audio communication path.

* * * * *